United States Patent [19]
Morel et al.

[11] Patent Number: 5,298,874
[45] Date of Patent: Mar. 29, 1994

[54] RANGE OF MOLDED CASE LOW VOLTAGE CIRCUIT BREAKERS

[75] Inventors: Robert Morel, Herbeys; Jean-Pierre Nebon, St. Martin le Vinoux; Jean-Pierre Nereau, Seyssinet Pariset; Philippe Perrier, Le Touvet, all of France

[73] Assignee: Merlin Gerin, France

[21] Appl. No.: 952,256

[22] Filed: Sep. 28, 1992

[30] Foreign Application Priority Data

Oct. 15, 1991 [FR] France .................. 91 12792

[51] Int. Cl.⁵ .......................................... H01H 75/00
[52] U.S. Cl. ............................................ 335/8; 335/10; 335/202
[58] Field of Search ............................ 335/8–10, 335/202, 167–176

[56] References Cited

U.S. PATENT DOCUMENTS

| | | |
|---|---|---|
| 2,967,917 | 1/1961 | Cole . |
| 3,631,369 | 12/1971 | Menocal . |
| 4,090,157 | 5/1978 | Rys ........................... 335/8 |
| 4,166,988 | 9/1979 | Ciarcia et al. .............. 335/9 |
| 4,347,488 | 8/1982 | Mune et al. ................ 335/9 |
| 4,910,485 | 3/1990 | Bolongeat-Mobleu et al. . |
| 5,103,198 | 4/1992 | Morel et al. . |

FOREIGN PATENT DOCUMENTS

| | | |
|---|---|---|
| 0174904 | 3/1986 | European Pat. Off. . |
| 0208613 | 1/1987 | European Pat. Off. . |
| 7044973 | 4/1971 | Fed. Rep. of Germany . |
| 2285707 | 4/1976 | France . |

*Primary Examiner*—Lincoln Donovan
*Attorney, Agent, or Firm*—Parkhurst, Wendel & Rossi

[57] ABSTRACT

A modular low voltage multipole circuit breaker, including a plurality of identical single-pole breaking units each including a parallelipipedic insulating box having two opposite parallel large side faces and two opposite parallel small side faces, two terminals located at respective opposite parallel small side faces, a stationary contact electrically connected to one of the terminals, a movable contact cooperable between a first position contacting the stationary contact and a second position separated from the stationary contact and a molded case for housing the single-pole breaking units. The molded case has two opposite parallel side walls having the same thickness, the single-pole breaking units being sequentially arranged and parallel to each other and parallel to the side walls such that adjacent single-pole breaking units are spaced apart a distance equal to twice the thickness of the side walls, the single-pole breaking units being spaced apart at a constant pitch. An operating mechanism is provided to be common to all single-pole breaking units for simultaneously operating all single-pole breaking units.

10 Claims, 8 Drawing Sheets

RANGE OF MOLDED CASE LOW VOLTAGE CIRCUIT BREAKERS

BACKGROUND OF THE INVENTION

The invention relates to a range of low voltage circuit breakers with double housing and one or more poles, made up from standard single-pole breaking units housed in a common molded case and in which each single-pole unit comprises a parallelepipedic insulating box having two opposite parallel large side faces and two opposite parallel small side faces and containing a movable contact, pivotally mounted on an axis perpendicular to said large faces, and designed to cooperate with a stationary contact, adjacent to a small face which bears a terminal connected to the associated stationary contact, several single-pole units being arranged in parallel in the case of a multipole circuit breaker.

Depending on the type of electrical installation, protective circuit breakers are either single-pole or multipole, for example with two, three or four poles. For a given rating, the manufacturer offers a range of molded case circuit breakers. Some components or parts of these circuit breakers, notably the contact parts and extinguishing chambers, are common to the different poles. However this standardization, indispensable to reduce the manufacturing cost, is not taken very far. In modular systems, well-known to those specialized in the art, multipole circuit breakers are achieved by assembly of single-pole circuit breakers, but these systems do not take account of the possibility of using certain parts, notably the operating mechanism, for actuation of all the circuit breaker poles. It is moreover difficult to achieve sufficiently solid and aesthetic assemblies between single-pole circuit breakers.

It has already been proposed to achieve circuit breakers by assembly of single-pole units, housed in cases of different sizes, to accommodate either one or several poles in the case of a multipole circuit breaker.

These circuit breakers do not respect modularity, in the sense that the width of a multipole circuit breaker is not a multiple of that of the single-pole circuit breaker. The pitch between the terminals is also different between a multipole circuit breaker and single-pole circuit breakers adjoined to one another. This pitch difference prevents a power supply by distribution bars, provided with regularly spaced feeders.

SUMMARY OF THE INVENTION

The object of the present invention is to achieve a range of circuit breakers having modularity of connection, while being made up from single-pole units housed in a case common to the different poles. The range of circuit breakers according to the invention is characterized in that said movable contact is arranged as a contact bridge cooperating with two stationary contacts, each respectively adjacent to one of said small faces, to bring about double breaking in two extinguishing chambers of the single-pole unit, that said single-pole units, arranged in parallel, are separated by a gap twice the thickness of the wall of the case adjoined to the large end side face, so as to preserve the modularity defined by the single-pole circuit breaker and that a mechanism with operating handle and toggle is common to all the single-pole units.

The contacts and associated extinguishing chambers are contained in a box or envelope forming a sub-assembly, enabling either a single-pole circuit breaker to be achieved by housing a single-pole unit in a case of corresponding width, or multipole circuit breakers to be achieved by housing several single-pole units inside a case of suitable width. By arranging a gap between the single-pole units of a multipole circuit breaker, it is possible to achieve a constant pitch between units and preserve the modularity of the circuit breaker. This gap of small thickness, for example about 5 mm, is used to run wiring, or to allow passage of operating or movement transmission rods, between the rear part of the circuit breaker and the front part. The use of a contact bridge associated with two extinguishing chambers, located on each side of this bridge, gives the single-pole unit a certain symmetry and an external shape in the form of a straight parallelepiped of small dimensions. The single-pole box or envelope confines the breaking components, and insulates each pole from the adjacent poles, forming insulating partitions separating the poles from one another. The external case containing the different single-pole units constitutes an additional insulation.

The gaps separating the single-pole units are advantageously materialized by plates forming spacers or shims, these plates being provided with passages or ducts for passage of connecting wires or operating rods. The spacers can play a part in connection between the single-pole units, and for this purpose comprise centering pins cooperating with the walls of the adjacent single-pole units.

According to an important development of the invention, a spacer incorporates an actuator reacting to an overpressure in the single-pole unit or units, to transmit a tripping order to the operating mechanism when the pressure exceeds a preset threshold. Limiting circuit breakers are equipped with high-speed opening contacts by electrodynamic repulsion when a short-circuit occurs, and this speed of opening brings about current limiting. High-speed opening of the contacts creates a fast pressure increase, due to the action of the arc drawn on the contacts, and this increase is used to actuate the circuit breaker opening mechanism. U.S. Pat. No. 5,103,198 describes an overpressure trip device of this type and this document should be referred to advantageously for further details, notably on the advantages of tripping selectivity.

According to the invention, each pole is housed in a box, of small volume, which favors a high-speed pressure increase and operation of the overpressure actuator associated with the box. By housing the actuator in the spacer, communication with the adjacent single-pole units can be obtained via simple orifices arranged in the units facing a cavity of the spacer receiving a pressure detector. The cavity can be arranged as a cylinder which cooperates with a piston bearing a tripping control lever. An overpressure actuator can be common to the two adjacent single-pole units or to all the single-pole units in which case ducts, advantageously arranged or formed by hollow assembly rivets, create communications between the different units and the actuator.

The spacers can serve the purpose of fixing the single-pole units to the case, for example by simple screws passing through the back-plate of the case.

All the single-pole units making up the circuit breaker can be secured by any suitable means, for example by threaded rods, or be simply held by insertion in the circuit breaker case. The standard type operating mechanism with operating handle and toggle is common to all the poles and is advantageously associated with the center single-pole unit of the circuit breaker. This mechanism is coupled to the contact bridge of this center single-pole unit, and movement is transmitted to the other single-pole units by any operative means, notably by mechanical links, by means of transmission rods, or by means of clipping, or jointing of conjugate contact bridge support shaft parts. The operating mechanism is laterally framed in a manner well-known in itself, by two metal flanges, whose distance apart corresponds appreciably to the width of a single-pole unit, and these flanges are fixedly secured to the associated single-pole unit.

The widthwise modularity of the cases is for example 35 mm, that is to say that the width of the cases of the different circuit breakers in the range is a multiple of 35 mm, this modularity being preserved at the level of the connection terminals which are arranged with a pitch of 35 mm. This width is adapted to suit the circuit breaker rating.

The invention naturally also relates to the circuit breakers belonging to this range.

BRIEF DESCRIPTION OF THE DRAWINGS

Other advantages and features will become more clearly apparent from the following description of an illustrative embodiment of the invention, given as a non-restrictive example only and represented in the accompanying drawings in which.

DESCRIPTION OF THE PREFERRED EMBODIMENT

Figure 6:
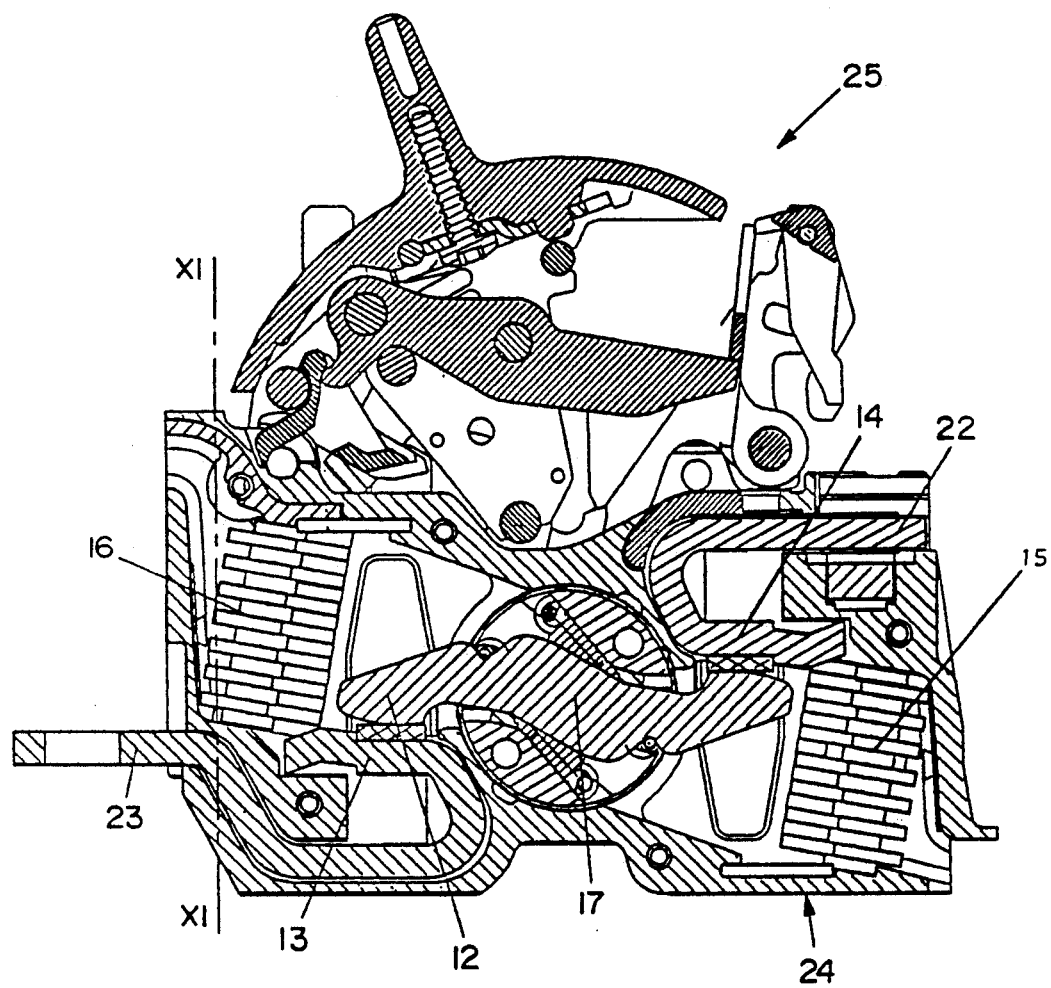
FIG. 6 is a schematic axial cross sectional view of a single-pole unit associated with an operating mechanism of a circuit breaker according to the invention.

In the drawings, a single-pole breaking unit 10 comprises a box or envelope 11 of general parallelepipedic shape, made of molded plastic material, inside which there is rotationally mounted a contact bridge 12, which cooperates with a pair of stationary contacts 13,14. Each pair of contacts 12,13; 12,14 has associated with it an extinguishing chamber 15,16, the assembly being appreciably symmetrical with respect to the rotation axis 17 of the contact bridge 12. The axis 17 extends appreciably in the center of the box 11 perpendicularly to the two large side faces 18,19 of the box 11. On the two small side faces 20,21 of the box 11 there are arranged terminal strips 22,23 respectively connected to the stationary contacts 13,14. In the closed position of the contact bridge 12, the latter extends appreciably parallel to the back-plate 24 of the box 11, and the current input for example via the terminal strip 22 flows through the contacts 12,13,14 and is output via the opposite terminal strip 23. Clockwise rotation of the contact bridge 12 in FIG. 6 moves the contact bridge 12 to the open position. A single-pole unit 10 of the kind mentioned is described in U.S. Pat. No. 4,910,485 and this patent should advantageously be referred to for further details.

Figure 1:
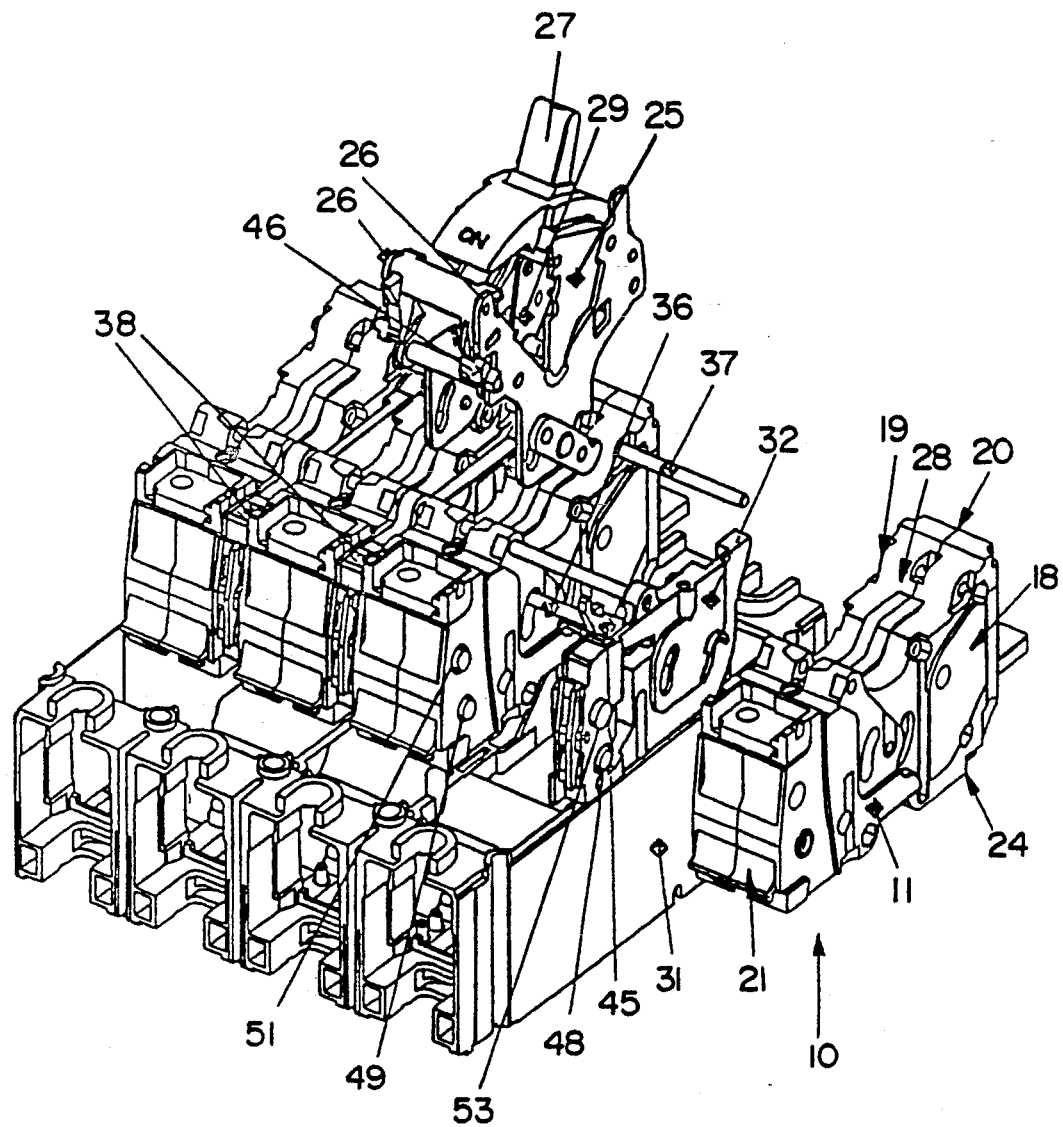
FIG. 1 is a schematic exploded perspective view of a four-pole circuit breaker according to the invention.
Figure 2:
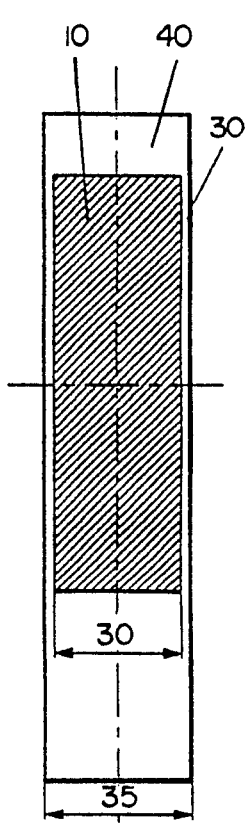
FIG. 2 is a schematic plan view of a single-pole circuit breaker of the range of circuit breakers according to FIG. 1.

According to the invention a single-pole low voltage circuit breaker is achieved by associating a mechanism 25 with the single-pole unit 10, and by housing the assembly formed by the unit 10 and mechanism 25 in a molded case 40 (FIG. 2). The mechanism 25 is framed by two metal flanges 26 whose distance apart corresponds to the width of the single-pole unit 10, to which these flanges 26 are fixed by any suitable means. The mechanism 25 of a standard type with handle 27 and toggle 29 is located on the upper face 28 of the single-pole unit 10, and is connected to the movable contact bridge 12. The single-pole unit 10 is housed without lateral clearance in the case 40, and the width (for example 30 mm) of the unit 10 is only increased by the thickness of the side wall 30 of the case 40 to reach for example 35 mm. It can easily be seen that when several single-pole circuit breakers are adjoined to one another by their large side faces on a distribution panel, the pitch of the connection terminals is 35 mm, which corresponds to the standard distance of the comb connectors or supply bars.

Figure 3:
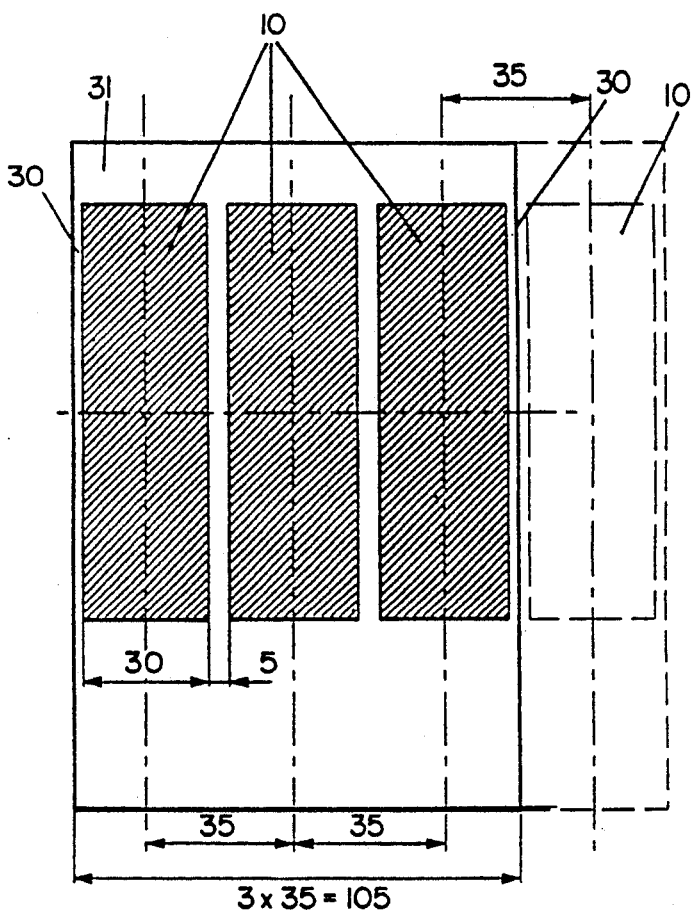
FIG. 3 is a similar view to that of FIG. 2, of a three-pole circuit breaker, a fourth pole being represented by the broken lines.

To achieve a multipole circuit breaker, several single-pole units 10 are arranged in a case 31 of suitable width. FIG. 3 represents a three-pole circuit breaker, having three single-pole units 10 arranged in parallel in a case 31 whose width is three times that of the case 40 of the single-pole circuit breaker. The two end single-pole units 10 are adjoined to the walls 30 of the case 31, whereas the center unit 10 is located in the center of the case 31. This arrangement preserves the connection pitch, in this case 35 mm, and there remains between the center single-pole unit and the two end units a free space with a thickness twice that of the wall 30, this double thickness being for example 5 mm. It is clear that these dimensions are given as an example only, and that depending on the characteristics of the circuit breaker, they will be different, as will the connection pitch and modularity of the system.

In FIG. 3 the broken line represents the outlines of a four-pole circuit breaker having four units 10 housed in a case 31 whose width is increased by the value of one pitch to reach for example 140 mm. A two-pole circuit breaker would naturally only comprise two single-pole units 10 separated from one another by a 5 mm gap.

The single-pole units 10 can be positioned in the case 31 by any suitable means, but according to a preferred embodiment of the invention, spacer of plates 32,38 functioning as shims, are fitted between two successive single-pole units 10. The thickness of these spacers 32,38 corresponds to that of the gap, i.e. 5 mm, between the units 10. The spacer plates 32,38, advantageously made of molded plastic material, present grooves or ribs 33 which confine passages 34 for the base-plate 24 of the units 10 to communicate with the upper part 28. The passages 34 house the auxiliary wiring and the operating levers, for example the lever controlling pre-tripping when the circuit breaker is withdrawn or the lever controlling the auxiliary contacts, located on the upper face of the single-pole unit 10. The spacer plates 32,38 also have apertures 35 for the passage of the rods providing the mechanical connection between the movable contact bridges 12 of the different single-pole units 10. The mechanism 25 is common to all the single-pole units 10, and this mechanism is for example associated with the center pole, the movement being transmitted to the end poles 10 by transverse rods 36 coupling the movable contact bridges 12. The spacer plate 32,38 can present on one or both of these faces positioning pins which fit into conjugate orifices of an adjacent large side face of the boxes 11. The mechanism 25 can be a standard mechanism for the whole circuit breaker range, possibly reinforced by the addition of an additional mechanism. The different single-pole units 10 can be secured before being fitted in the case 31, for example by screws or tie-rods 37, but it is clear that this positioning can also be achieved by insertion in the case 31 which has ribs for guiding and positioning the different single-pole units.

Fixing can also be achieved or comprise screws (not shown) passing through orifices arranged in the back-plate of the case 31 and screwed into the spacers 32,38.

Figure 4:
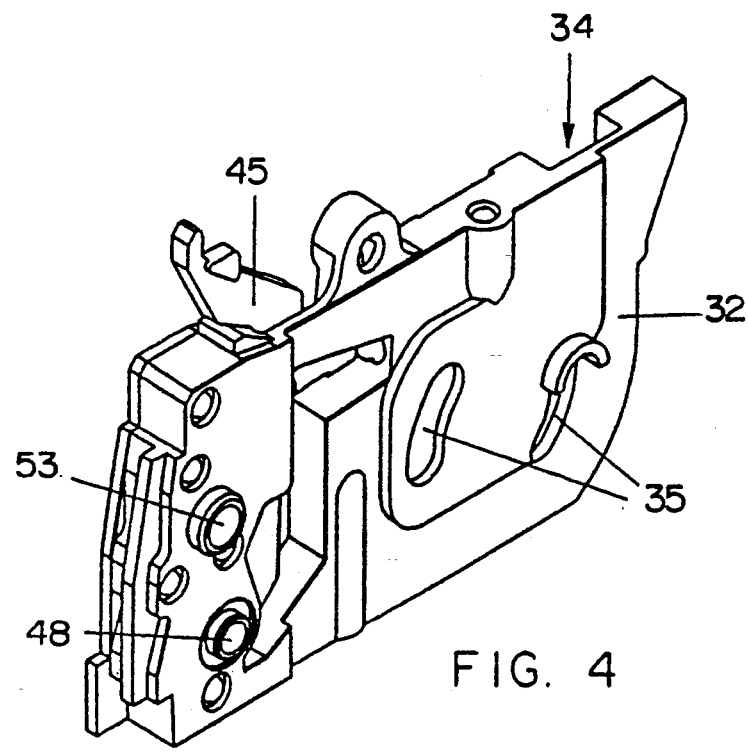
FIG. 4 is an enlarged scale perspective view of a spacer according to FIG. 1, with an overpressure detector.
Figure 5:
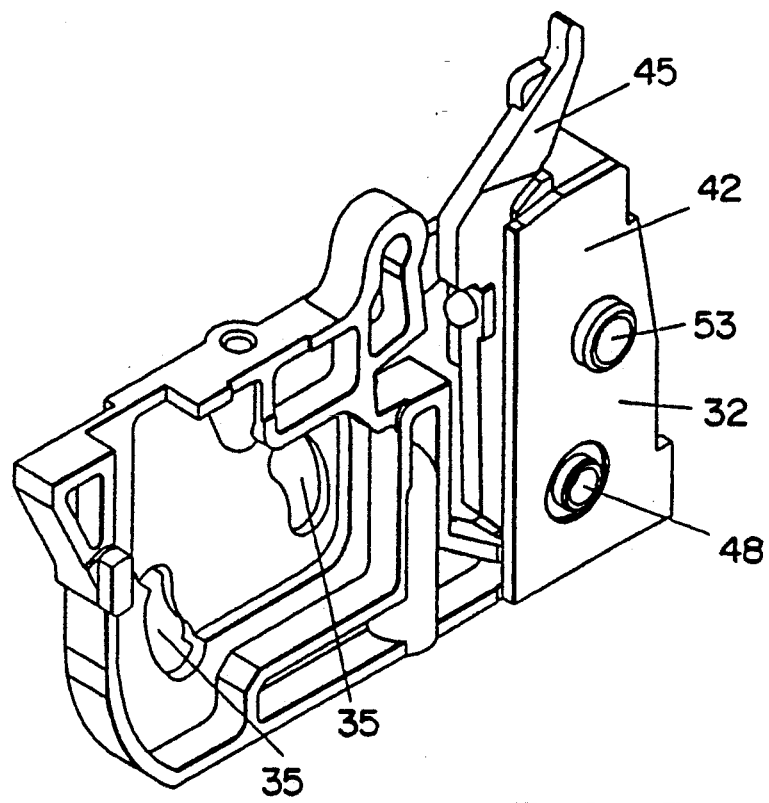
FIG. 5 is a similar view to that of FIG. 4, showing the opposite face of the spacer.
Figure 7:
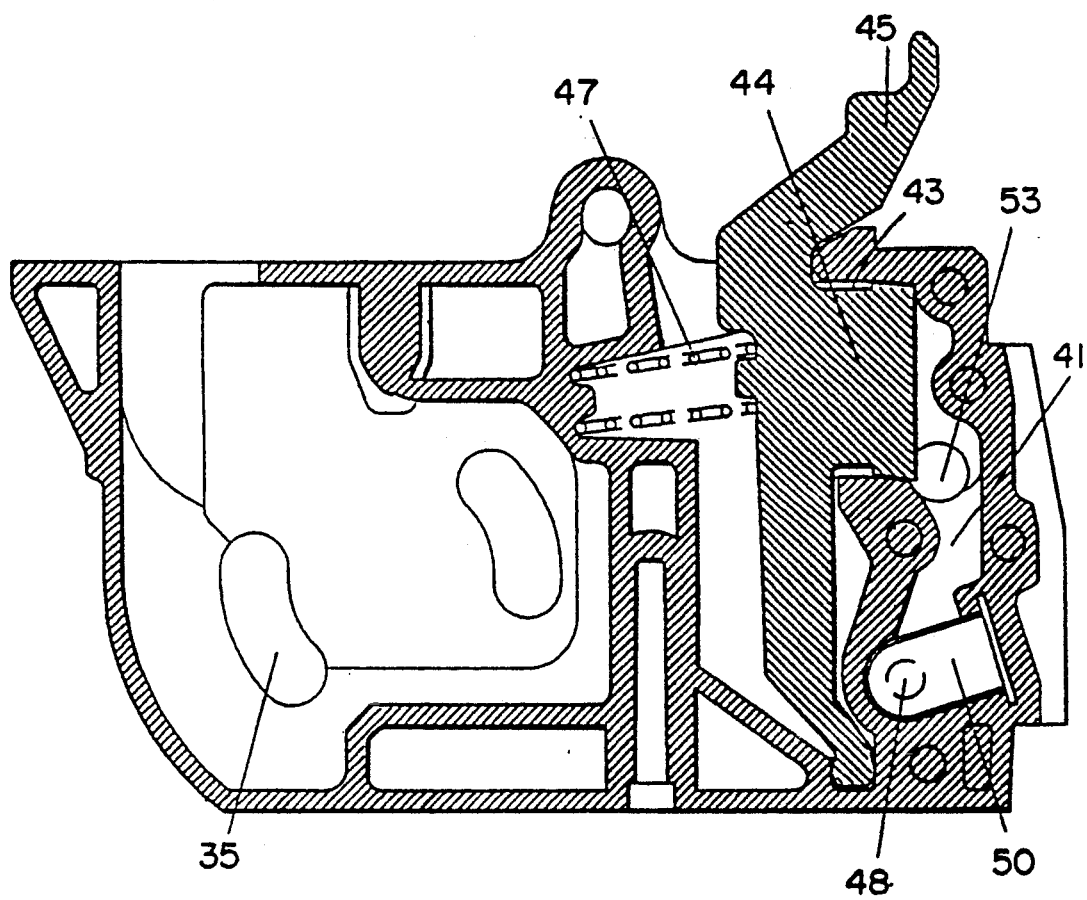
FIG. 7 is a cross sectional view of the spacer according to FIG. 5.

Referring more particularly to FIGS. 4,5 and 7, it can be seen that a spacer 32 comprises a cavity 41 tightly capped by a cover 42 and partially shaped as a sheath 43 in which a piston 44 slides. The piston 44 bears a lever 45 which protrudes out from the upper part 28 of the units 11 and which cooperates with a latch 46 of the mechanism 25. A tared spring 47 biases the lever 45 to the disengaged position represented in FIG. 7. When the pressure in the cavity 41 exceeds a preset threshold, the piston 44 pushes the lever 45 against the force of the spring 47 to the position releasing the latch 46 to bring about opening of the circuit breaker. Piston 44 and lever 45 thereby form an overpressure actuator.

The cavity 41 communicates with the boxes 11 of the adjacent units 10 via conjugate orifices 48,49, arranged in the side walls respectively of the cavity 41 and boxes 11. An over-pressure generated in one of the single-pole units 10, adjacent to the spacer 32, equipped with an overpressure actuator 44,45, is transmitted to the cavity 41 via the orifices 48,49 to actuate the lever 45. The orifices 48,49 are provided with check valves 50 preventing any backflow of the gases from the cavity 41 to the single-pole units 10.

Figure 8:
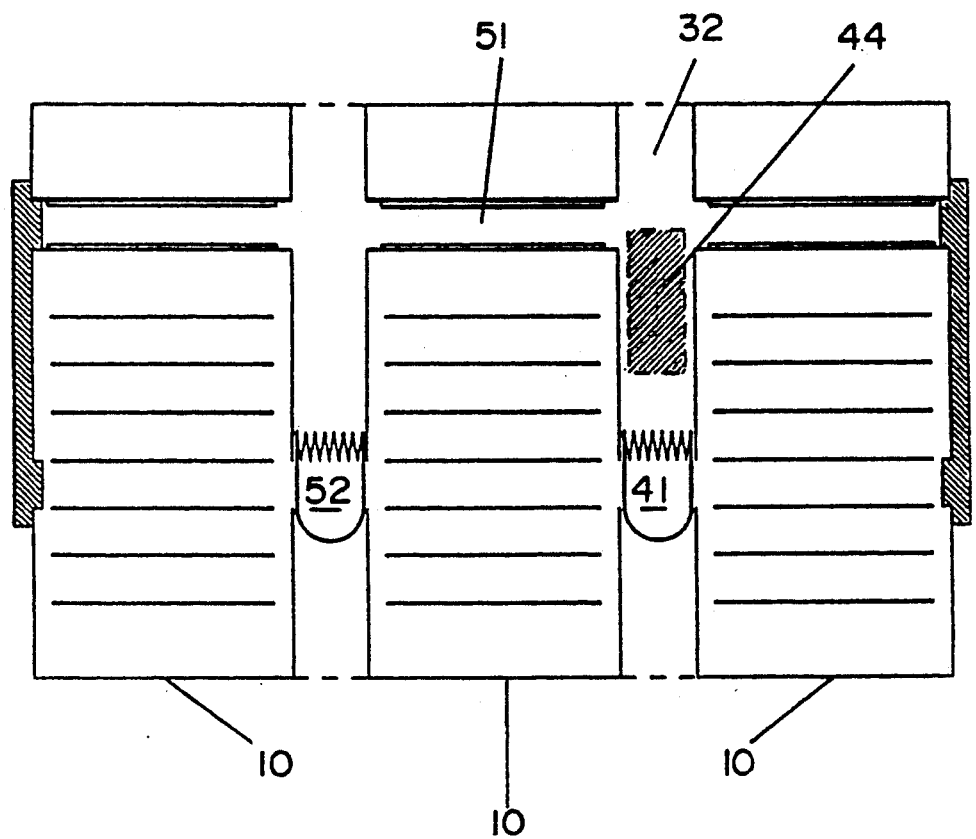
FIG. 8 illustrates the communications between the single-pole units and the overpressure detector.
Figure 9:
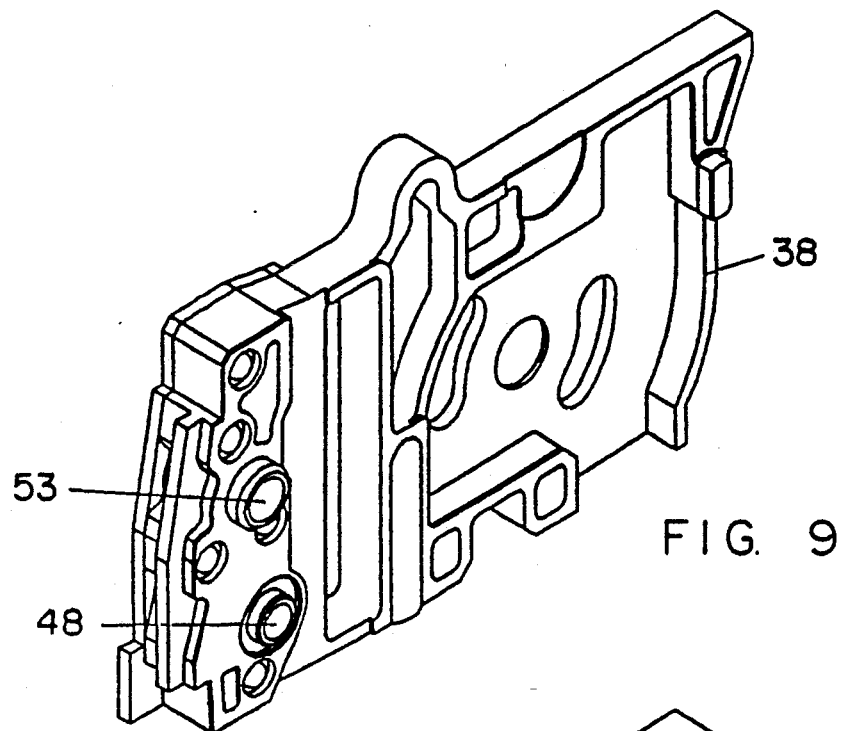
FIGS. 9 and 10 are similar views to FIGS. 4 and 5 of a spacer without an overpressure detector.
Figure 10:
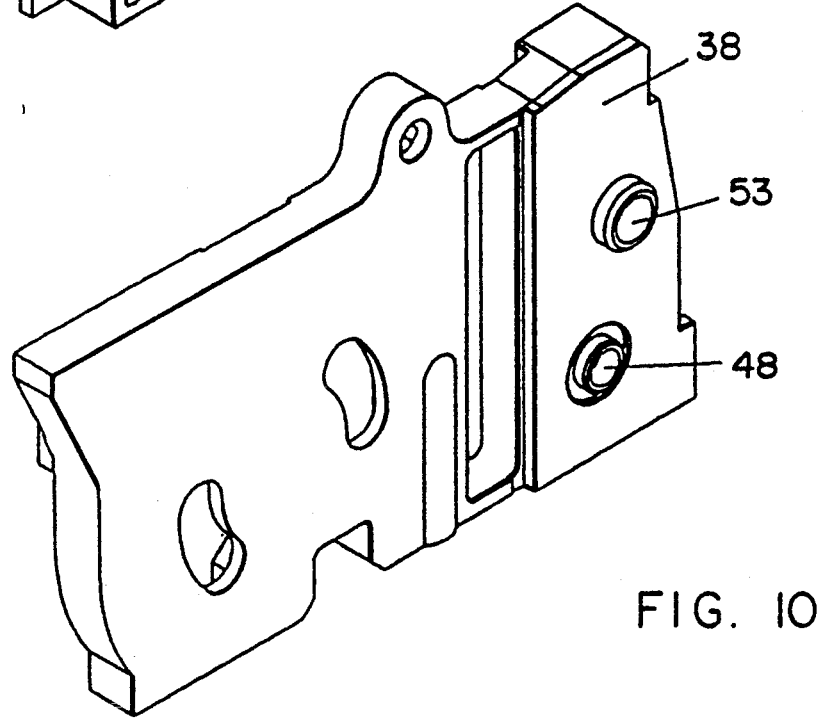
Figure 11:
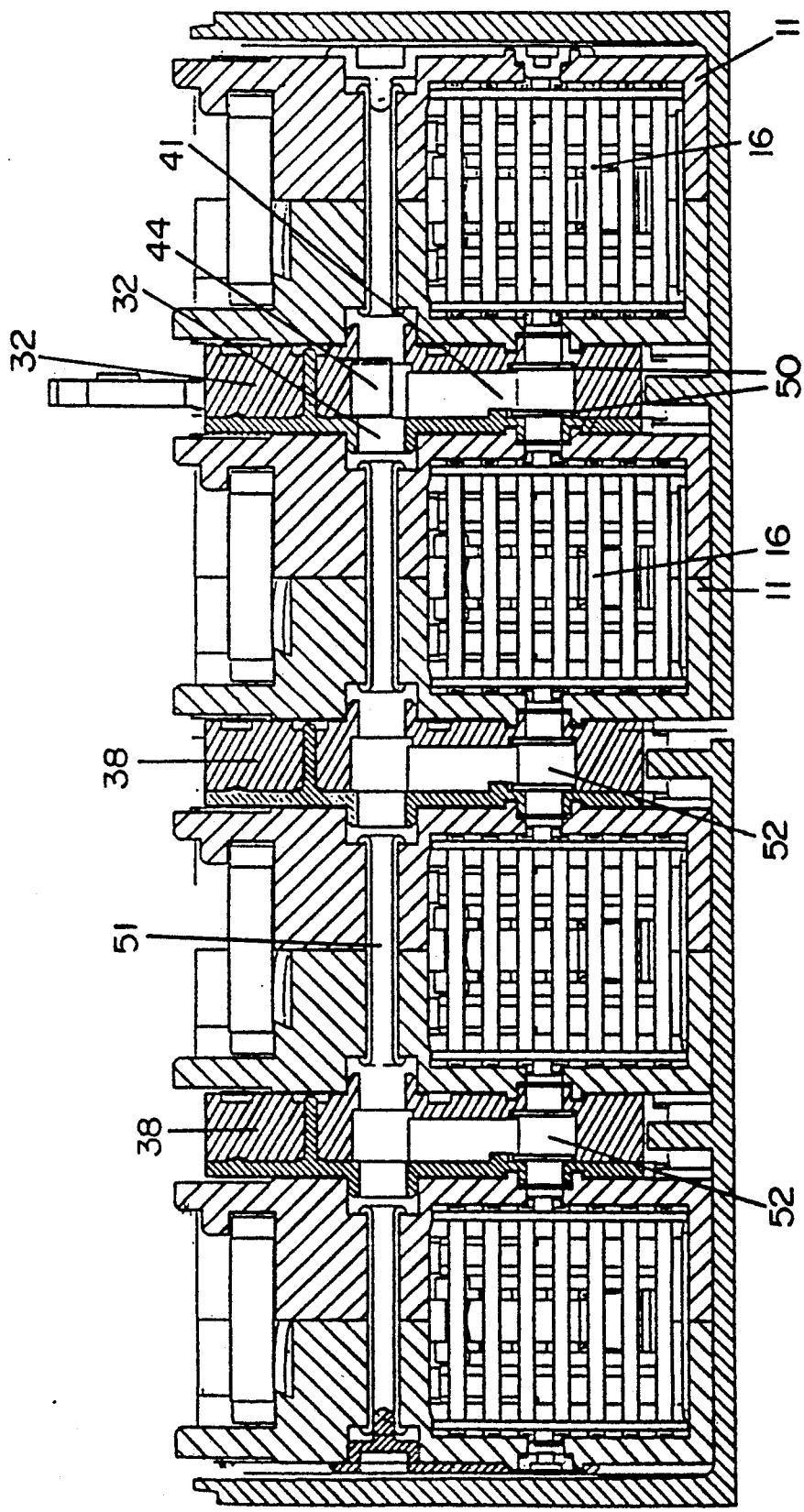
FIG. 11 is a cross sectional view along the line XI—XI of FIG. 6 showing the assembled single-pole units and spacers.

Each pair of single-pole units 10 can have associated with it a spacer 32 with overpressure actuator 44,45, fitted between the two units 10, but according to a preferred embodiment represented in FIGS. 8 and 11, the actuator 44,45 is common to all the circuit breaker units 10. The cavity 41 communicates in this case both with the adjacent units 10 via the orifices 48,49 and with the distant single-pole unit or units via ducts 51. For this purpose, the spacers 38, not provided with an overpressure actuator, have a chamber 52, similar to the cavity 41 of the other spacers 32, which communicates with the adjacent single-pole units 10 via orifices 48,49 to collect the overpressures generated in these units 10. The chambers 52 of the different spacers 38 are connected to the cavity 41 by the duct 51, formed by the tubular assembly rivets of the boxes 11 of the intercalated units 10. The duct 51 is extended by an orifice 53 which inlets to the cavity 41. The connection can naturally be achieved in a different manner and valves 50 prevent any gas from flowing from the ducts 51 to the units 10.

It can easily be seen that an overpressure occurring in any one of the single-pole units is transmitted to the cavity 41 to act on the piston 44 and actuate tripping when this overpressure exceeds a preset threshold. Detailed operation of this actuator is described in the above-mentioned patent.

The case 31 in two parts provides a complementary insulation to that of the boxes 11, and the assembly constitutes a modular system which is simple to assemble.

The circuit breaker trip unit (not shown) can be incorporated in the case 31 or possibly be adjoined to the outside of this case 31, in a manner well-known to those specialized in the art. Auxiliary units, notably for control or signalling, can also be located in the case 31, or be associated with the latter. A whole range of circuit breakers can be achieved from a standard single-pole unit 10, with a modularity corresponding to that of the single-pole circuit breaker. The use of a contact bridge ensures double breaking and enables the overall dimensions to be reduced with an appreciably symmetrical arrangement.

The invention is naturally in no way limited to the embodiment more particularly described, but extends to cover alternative embodiments, notably those wherein the spacer plates 32 are replaced by simple shims, or those wherein control of the contact bridges is achieved in a different manner.

We claim:
1. A modular low voltage multipole circuit breaker, comprising:
 a plurality of identical single-pole breaking units each comprising a parallelipipedic insulating box having two opposite parallel large side faces and two opposite parallel small side faces, two terminals located at respective opposite parallel small side faces, at least one stationary contact electrically connected to at least one of said terminals, a movable contact cooperable between a first position contacting said stationary contact and a second position separated from said stationary contact;
 a molded case for housing said single-pole breaking units, said molded case having two opposite parallel side walls having the same thickness, said single-pole breaking units being sequentially arranged and parallel to each other and parallel to said side walls such that adjacent single-pole breaking units are spaced apart a distance equal to twice said thickness of said side walls, said single-pole breaking units being spaced apart at a constant pitch; and
 a single operating mechanism associated with said multipole circuit breaker common to all and usable on any of said single-pole breaking units for simultaneously operating all single-pole breaking units.

2. The multipole circuit breaker of claim 1, wherein said molded case has a width which is multiple of 35 mm and said constant pitch is 35 mm.

3. The multipole circuit breaker of claim 1, wherein adjacent single-pole breaking units are spaced apart from each other by spacers.

4. The multipole circuit breaker of claim 3, wherein said spacers comprise plates having grooves therethrough for passage of at least one of control levers and wiring through said grooves.

5. The multipole circuit breaker of claim 3, wherein at least one spacer comprises a cavity and wherein an adjacent insulating box comprises an orifice in gas communication with said cavity, said at least one spacer further comprising actuator means for tripping said circuit breaker upon a pressure in said cavity beyond a preset threshold.

6. The multipole circuit breaker of claim 5, wherein said actuator comprises a piston and a cylinder, said piston being slidably mounted in said cylinder such that said piston slides in reaction to said pressure in said cavity.

7. The multipole circuit breaker of claim 5, further comprising ducts formed by a tubular assembly interconnecting said insulating boxes, said ducts being in gas communication with said cavity of said at least one spacer.

8. The multipole circuit breaker of claim 1, wherein the operating mechanism comprises a toggle fixed to two opposite side flanges, said operating mechanism being disposed on a single pole breaking unit such that the metal flanges are spaced apart from each other a distance equal to the width of the single-pole breaking unit.

9. The multipole circuit breaker of claim 1, wherein the movable contacts of the single-pole breaking units are mechanically coupled together such that said movable contacts are simultaneously rotated between said first and second positions.

10. The multipole circuit breaker of claim 1, further comprising positioning pins, wherein said two opposite parallel large side faces of said insulating boxes comprise holes extending therethrough, said positioning pins extending through said holes to position adjacent insulating boxes with respect to each other.

* * * * *